United States Patent
Chun et al.

(10) Patent No.: US 8,879,510 B2
(45) Date of Patent: Nov. 4, 2014

(54) METHOD AND DEVICE FOR TRANSMITTING MIDAMBLE SIGNALS IN WIRELESS COMMUNICATION SYSTEM

(75) Inventors: Jin Young Chun, Anyang-si (KR); Jin Sam Kwak, Anyang-si (KR); Wook Bong Lee, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 155 days.

(21) Appl. No.: 13/807,703

(22) PCT Filed: Jun. 30, 2011

(86) PCT No.: PCT/KR2011/004789
§ 371 (c)(1),
(2), (4) Date: Jan. 28, 2013

(87) PCT Pub. No.: WO2012/002743
PCT Pub. Date: Jan. 5, 2012

(65) Prior Publication Data
US 2013/0215868 A1 Aug. 22, 2013

Related U.S. Application Data

(60) Provisional application No. 61/360,921, filed on Jul. 2, 2010.

(51) Int. Cl.
| H04Q 7/00 | (2006.01) |
| H04B 7/06 | (2006.01) |
| H04W 72/04 | (2009.01) |
| H04J 13/00 | (2011.01) |

(52) U.S. Cl.
CPC .............. *H04W 72/04* (2013.01); *H04B 7/0613* (2013.01); *H04J 13/0014* (2013.01); *H04B 7/0691* (2013.01); *H04B 7/0684* (2013.01)
USPC ........... 370/334; 370/328; 370/280; 370/281; 370/208; 370/210

(58) Field of Classification Search
None
See application file for complete search history.

(56) References Cited

U.S. PATENT DOCUMENTS

| 6,917,597 | B1 * | 7/2005 | Schmidl et al. ................ 370/280 |
| 8,498,252 | B2 * | 7/2013 | Davydov et al. .............. 370/329 |
| 2010/0165954 | A1 | 7/2010 | Lin et al. |
| 2010/0329374 | A1 * | 12/2010 | Pi .................................. 375/260 |
| 2014/0037024 | A1 * | 2/2014 | Ponnampalam et al. ..... 375/299 |

FOREIGN PATENT DOCUMENTS

| EP | 2015467 | 1/2009 |
| WO | 2009125946 | 10/2009 |

* cited by examiner

*Primary Examiner* — Duc C Ho
(74) *Attorney, Agent, or Firm* — Lee, Hong, Degerman, Kang & Waimey

(57) ABSTRACT

Discloses are a method and a device for transmitting midamble signals in a wireless communication system. The method for transmitting the midamble signals comprises the steps of: generating each of midamble signals for eight transmission antennas; and transmitting said midamble signals to a terminal through said eight transmission antennas. Among the midamble signals for said eight transmission antennas, a first midamble group which includes midamble signals for certain four transmission antennas and a second midamble group which includes midamble signals for the rest of four transmission antennas are transmitted through different resources.

15 Claims, 9 Drawing Sheets

METHOD AND DEVICE FOR TRANSMITTING MIDAMBLE SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2011/004789, filed on Jun. 30, 2011, which claims the benefit of U.S. Provisional Application Ser. No. 61/360,921, filed on Jul. 2, 2010, the contents of which are all hereby incorporated by reference herein in their entirety.

BACKGROUND OF THE INVENTION

1. Field of the Invention

The present invention relates to wireless communication, and more specifically to a method and a device for transmitting midamble signals in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Technology for supporting reliable and high-speed data service may include multiple input multiple output (MIMO). MIMO technology can be used to improve the efficiency of data transmission and reception using multiple transmission antennas and multiple reception antennas. MIMO technology includes spatial multiplexing, transmit diversity, beam-forming and the like. An MIMO channel matrix according to the number of reception antennas and the number of transmission antennas can be decomposed into a number of independent channels. Each of the independent channels is called a layer or stream. The number of layers is called a rank.

A pilot may be transmitted from a base station to a terminal through a downlink. The pilot may be referred to as a reference signal in accordance with a wireless communication system. Channel estimation may be performed or a channel quality indicator (CQI) may be measured using the pilot. The CQI may include a signal-to-interference noise ratio (SINR) and frequency offset estimation. In order to optimize performance of a system in different transmission environments, an IEEE 802.16m system provides a common pilot structure and a dedicated pilot structure. The common pilot structure and the dedicated pilot structure may be distinguished from each other in accordance with used resource. The common pilot may be used by all terminals and may be precoded by the same method as a method by which a data subcarrier in the same physical resource unit (PRU) is precoded. The dedicated pilot may be used for allotting localized and distributed resources. The dedicated pilot may be used by a terminal to which specific resource is allocated. Therefore, the dedicated pilot may be precoded or beamformed by the same method as a method by which the data subcarrier is precoded or beamformed. In the pilot structure, up to eight transmission streams may be defined. A unified pilot structure may be provided in accordance with the common pilot and the dedicated pilot.

On the other hand, midamble is signals transmitted by the base station so that the terminal may directly measure channel states. When the base station transmits the signals using a multiple-input and multiple-output (MIMO) technology through a plurality of antennas, different signals are transmitted to the antennas, respectively, in different positions in a resource region and the terminal receives the midamble to measure the channel states of the antennas of the base station and to estimate the channel state of a serving cell or the interference level of a neighbor cell. The base station may receive the channel sates estimated by the terminal to adaptively schedule resource.

When the plurality of antennas exist, a method for efficiently transmitting the midamble signals is required.

SUMMARY OF THE INVENTION

The present invention provides a method and a device for transmitting midamble signals in a wireless communication system, in particular, a method for efficiently transmitting midamble signals when the number of transmission streams is eight.

In an aspect, a method for transmitting midamble signals in a wireless communication system is provided. The method includes generating midamble signals for eight transmission antennas, and transmitting the midamble signals to a terminal through the eight transmission antennas. A first midamble group including midamble signals for certain four transmission antennas among the midamble signals for the eight transmission antennas and a second midamble group including midamble signals for remaining four transmission antennas among the midamble signals for the eight transmission antennas are transmitted through different resources.

The first midamble group and the second midamble group may be transmitted through different time resources.

The first midamble group may be transmitted in even frames, and the second midamble group may be transmitted in odd frames.

The first midamble group and the second midamble group may be transmitted through different time and frequency resources.

The first midamble group may be transmitted in even physical resource units (PRU) of even frames and in odd PRUs of odd frame, and the second midamble group may be transmitted in odd PRUs of the even frames and in even PRUs of the odd frames.

The first midamble group and the second midamble group may be transmitted through different sequence resources.

The first midamble group may be transmitted using half of Golay sequences, and the second midamble group may be transmitted using remaining half of the Golay sequences.

In another aspect, a device for transmitting midamble signals in a wireless communication system is provided.

The device includes a radio frequency (RF) unit for transmitting or receiving a radio signal, and a processor connected to the RF unit, and configured for generating midamble signals for eight transmission antennas, and transmitting the midamble signals to a terminal through the eight transmission antennas. A first midamble group including midamble signals for certain four transmission antennas among the midamble signals for the eight transmission antennas and a second midamble group including midamble signals for remaining four transmission antennas among the midamble signals for the eight transmission antennas are transmitted through different resources.

When the number of transmission streams is eight, channel states may be efficiently estimated through the midamble signals.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m is chiefly described as an example in order to clarify the description, but the technical spirit of the present invention is not limited to IEEE 802.16m.

Figure 1:
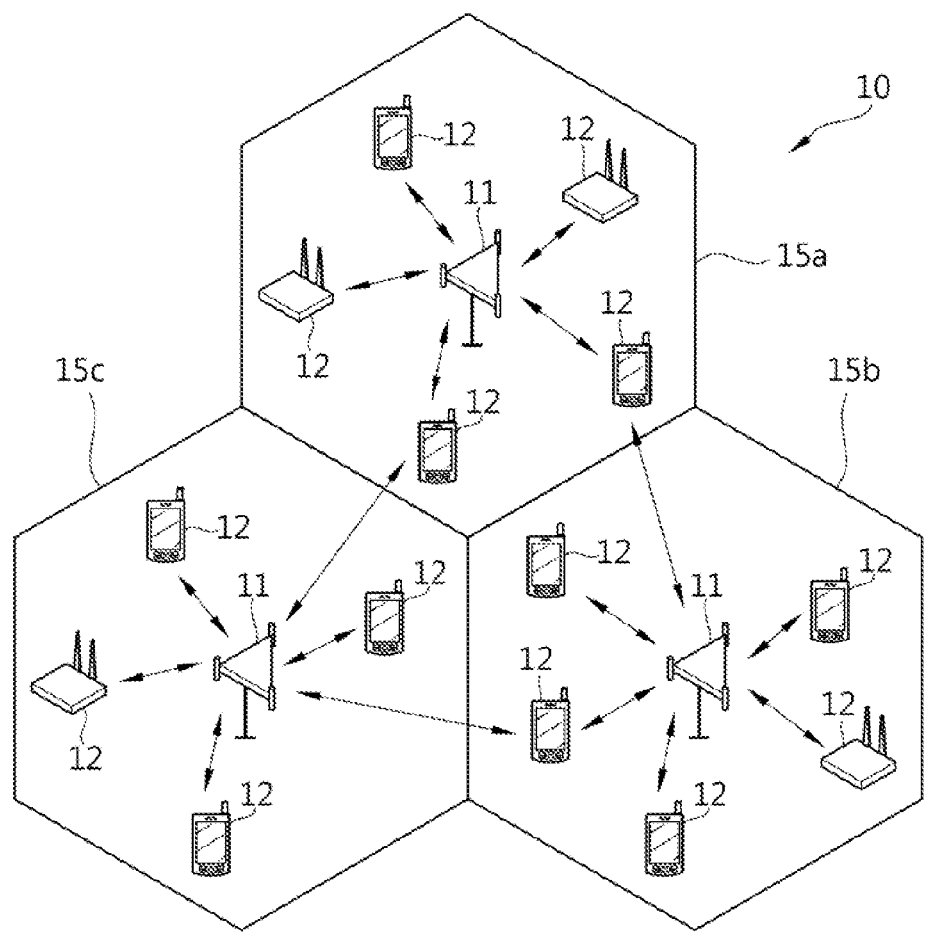
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
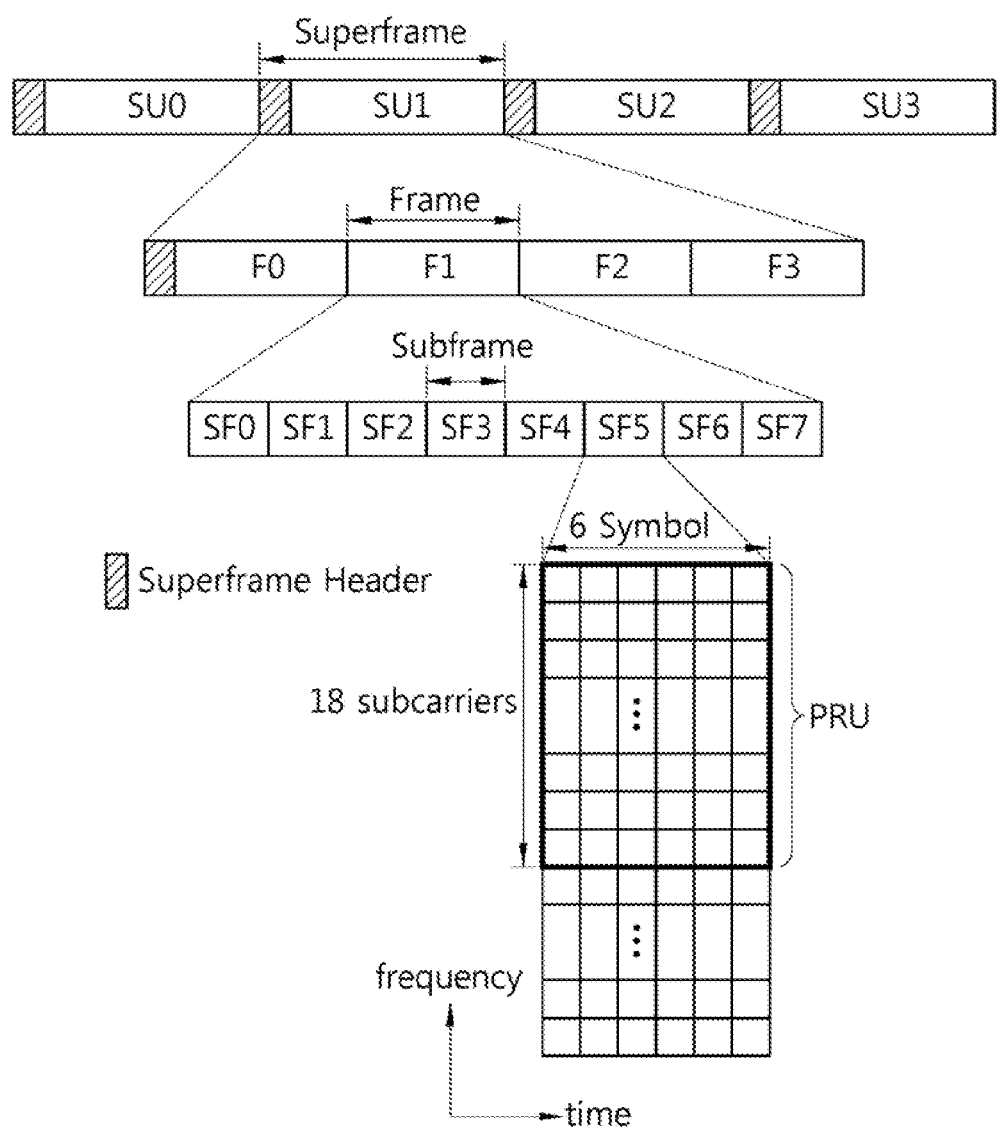
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) may be applied to the frame. In the TDD, each subframe is used in uplink or downlink transmission at the same frequency and at a different time. That is, subframes included in a TDD frame are divided into an uplink subframe and a downlink subframe in the time domain. A switching point refers to a point where a transmission direction is changed from an uplink region to a downlink region or from a downlink region to an uplink region. In the TDD, the number of the switching points in each frame may be two. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A superframe header (SFH) may carry an essential system parameter and system configuration information. The SFH may be located in a first subframe of a superframe. The SFH may occupy last 5 OFDMA symbols of the first subframe. The SFH can be classified into a primary-SFH (P-SFH) and a secondary-SFH (S-SFH). The P-SFH and the S-SFH may be transmitted in every superframe. The S-SFH may be transmitted in two consecutive superframes. Information transmitted on the S-SFH may be classified into three sub-packets, i.e., an S-SFH SP1, an S-SFH SP2, and an S-SFH SP3. Each sub-packet can be transmitted periodically with a different period. Information transmitted in the S-SFH SP1, the S-SFH SP2, and the S-SFH SP3 may have different importance from one another. The S-SFH SP1 may be transmitted with a shortest period, and the S-SFH SP3 may be transmitted with a longest period. The S-SFH SP1 includes information on network re-entry. The S-SFH SP2 includes information on initial network entry and network discovery. The S-SFH SP3 includes other important system information.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| Channel bandwidth, BW (MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, Fs (MHz) | | | 5.6 | 8 | 10 | 11.2 | 22.4 |
| FFT size, $N_{FFT}$ | | | 512 | 1024 | 1024 | 1024 | 2048 |
| Subcarrier spacing, $\Delta f$ (kHz) | | | 10.94 | 7.81 | 9.77 | 10.94 | 10.94 |
| Useful symbol time, Tb (µs) | | | 91.4 | 128 | 102.4 | 91.4 | 91.4 |
| G = 1/8 | Symbol time, Ts (µs) | | 102.857 | 144 | 115.2 | 102.857 | 102.857 |
| | FDD | Number of OFDMA symbols per 5 ms frame | 48 | 34 | 43 | 48 | 48 |
| | | Idle time (µs) | 62.857 | 104 | 46.40 | 62.857 | 62.857 |
| | TDD | Number of OFDMA symbols per 5 ms frame | 47 | 33 | 42 | 47 | 47 |
| | | TTG + RTG (µs) | 165.714 | 248 | 161.6 | 165.714 | 165.714 |
| G = 1/16 | Symbol time, Ts (µs) | | 97.143 | 136 | 108.8 | 97.143 | 97.143 |
| | FDD | Number of OFDMA symbols per 5 ms frame | 51 | 36 | 45 | 51 | 51 |
| | | Idle time (µs) | 45.71 | 104 | 104 | 45.71 | 45.71 |
| | TDD | Number of OFDMA symbols per 5 ms frame | 50 | 35 | 44 | 50 | 50 |
| | | TTG + RTG (µs) | 142.853 | 240 | 212.8 | 142.853 | 142.853 |
| G = 1/4 | Symbol time, Ts (µs) | | 114.286 | 160 | 128 | 114.286 | 114.286 |
| | FDD | Number of OFDMA symbols per 5 ms frame | 43 | 31 | 39 | 43 | 43 |
| | | Idle time (µs) | 85.694 | 40 | 8 | 85.694 | 85.694 |
| | TDD | Number of OFDMA symbols per 5 ms frame | 42 | 30 | 38 | 42 | 42 |
| | | TTG + RTG (µs) | 199.98 | 200 | 136 | 199.98 | 199.98 |
| Number of Guard subcarriers | Left | | 40 | 80 | 80 | 80 | 160 |
| | Right | | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ denotes a smallest power of 2 greater than $N_{used}$. A sampling factor is defined as $F_s = \text{floor}(n \cdot BW/8000) \times 8000$. A subcarrier spacing is defined as $\Delta f = F_s/NFFT$. A useful symbol time is defined as $T_b = 1/\Delta f$. A CP time is defined as $T_g = G \cdot T_b$. An OFDMA symbol time is defined as $T_s = T_b + T_g$. A sampling time is defined as $T_b/N_{FFT}$.

Figure 3:
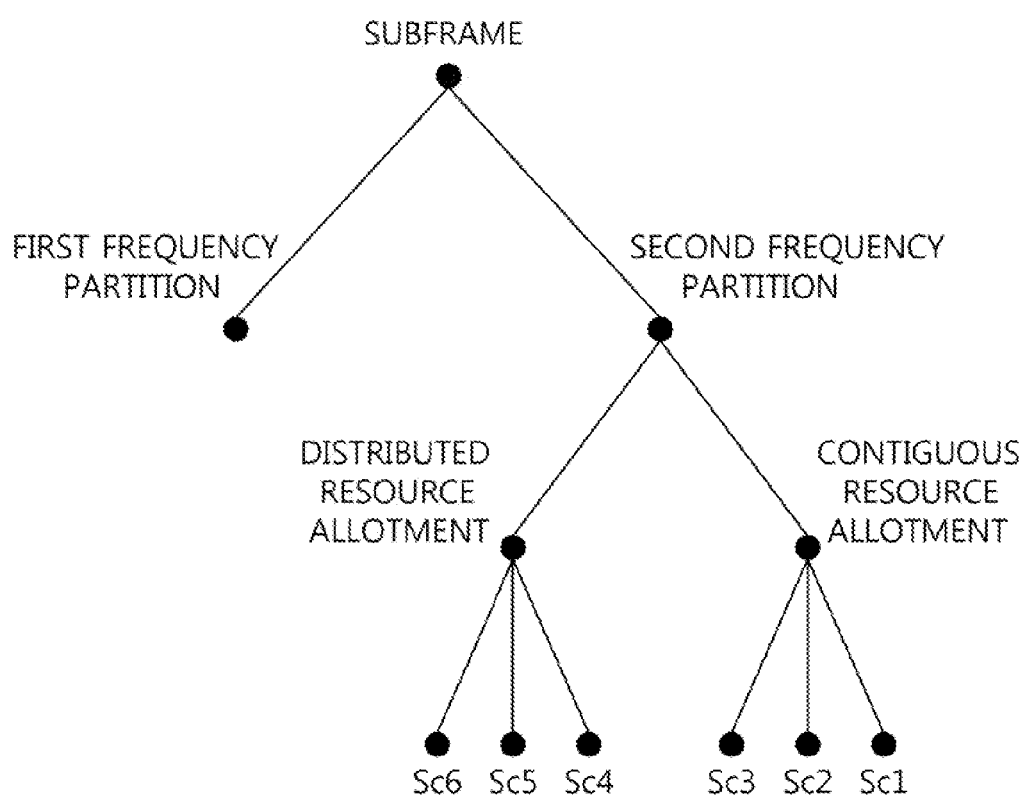
FIG. 3 shows an example of a downlink resource structure.

FIG. 3 shows an example of a downlink resource structure.

Each uplink subframe can be divided into 4 or less frequency partitions. Although a subframe is divided into two frequency partitions (i.e., FP1 and FP2) in FIG. 3, this is for exemplary purposes only, and thus the number of frequency partitions in the subframe is not limited thereto. Each frequency partition consists of at least one physical resource unit (PRU) across all available orthogonal frequency division multiple access (OFDMA) symbols in the subframe. In addition, each frequency partition may include contiguous/localized and/or distributed PRUs. Each frequency partition may be used for other purposes such as fractional frequency reuse (FFR). The FP2 of FIG. 3 includes both contiguous resource allocation and distributed resource allocation. 'Sc' denotes a subcarrier.

The PRU is a basic physical unit for resource allocation, and includes Psc contiguous subcarriers and Nsym contiguous OFDMA symbols. Psc may be 18. Nsym may be the same as the number of OFDMA symbols included in one subframe. Accordingly, Nsym may be determined according to a subframe type. For example, when one subframe consists of 6 OFDMA symbols, the PRU can be defined with 18 subcarriers and 6 OFDMA symbols. A logical resource unit (LRU) is a basic logical unit for distributed and contiguous resource allocations.

A distributed logical resource unit (DLRU) can be used to obtain a frequency diversity gain. The DLRU includes a group of subcarriers distributed in one frequency partition. A minimum unit of constituting the DLRU may be tone-pairs that are pairs of a plurality of subcarriers. A downlink DLRU may be obtained by performing subcarrier permutation for the data subcarrier of a distributed resource unit (DRU). The DRU has the same size as the PRU. That is, the DRU may include the Psc subcarriers and the Nsym OFMDA symbols.

A contiguous logical resource unit (CLRU) can be used to obtain a frequency selective scheduling gain. The CLRU includes a group of contiguous subcarriers in a resource allocated in a localized manner. The CLRU consists of a data subcarrier in a contiguous resource unit (CRU). The CRU has the same size as the PRU. The CLRU may be obtained by directly mapping the CRU. The CLRU may be divided into a subband LRU (hereinafter, referred to as SLRU) based on a subband (SB) CRU and a miniband LRU (hereinafter, referred to as NLRU) based on miniband (MB) CRU in accordance with the kind of the based CRU.

Meanwhile, a fractional frequency reuse (FFR) scheme can be used in a cellular system having multiple cells. The FFR scheme divides a full frequency band into a plurality of frequency partitions (FPs), and allocates the FP to each cell. According to the FFR scheme, different FPs can be allocated between neighbor cells, and the same FP can be allocated between cells separated far from each other. Therefore, inter-cell interference (ICI) can be reduced, and performance of a UE located in a cell edge can be increased.

Figure 4:
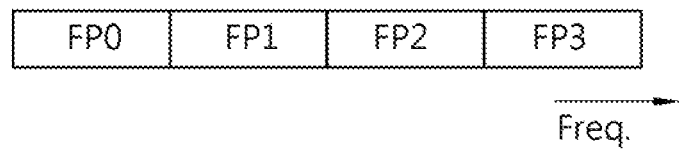
FIG. 4 shows an example of a method of dividing a full frequency band into a plurality of FPs.

FIG. 4 shows an example of a method of dividing a full frequency band into a plurality of FPs.

Referring to FIG. 4, the full frequency band is divided into a first FP (i.e., FP0), a second FP (i.e., FP1), a third FP (i.e., FP2), and a fourth FP (i.e., FP3). Each FP can be physically or logically divided from the full frequency band.

Figure 5:
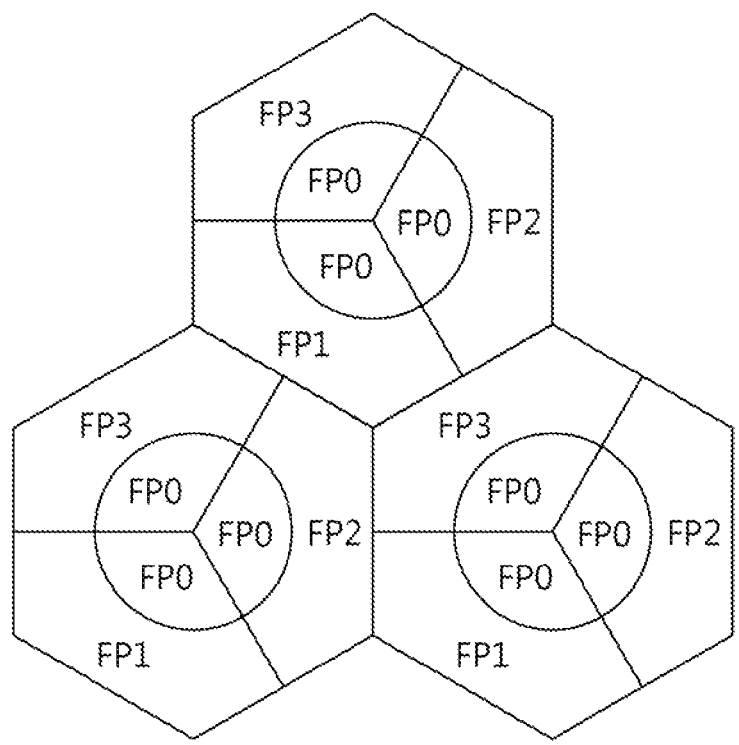
FIG. 5 shows an example of a cellular system using an FFR scheme.

FIG. 5 shows an example of a cellular system using an FFR scheme.

Referring to FIG. 5, each cell is divided into an inner cell and a cell edge. Further, each cell is divided into three sectors. It is assumed that a full frequency band is divided into four FPs (i.e., FP0, FP1, FP2, and FP3).

The first FP (i.e., FP0) is allocated in the inner cell. Any one of the second FP (i.e., FP1) to the fourth FP (i.e., FP3) is allocated in each sector of the cell edge. In this case, different FPs are allocated between neighbor cells. Hereinafter, an allocated FP is referred to as an active FP, and an unallocated FP is referred to as an inactive FP. For example, when the second FP (i.e., FP1) is allocated, the second FP is an active FP, and the third FP (i.e., FP2) and the fourth FP (i.e., FP3) are inactive FPs.

A frequency reuse factor (FRF) can be defined as the number of cells (or sectors) into which the full frequency band can be divided. In this case, the FRF may be 1 in the inner cell, and may be 3 in each sector of the cell edge.

Figure 6:
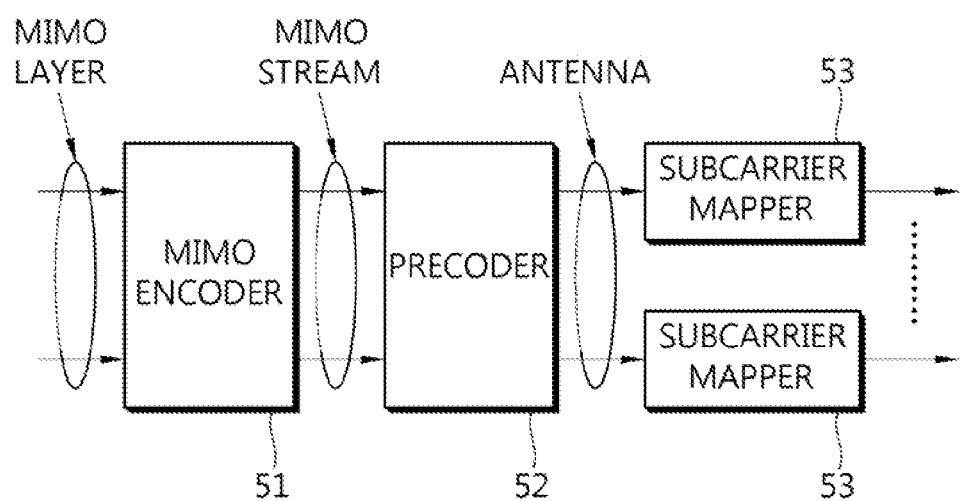
FIG. 6 shows a structure of a downlink MIMO in a transmitter.

FIG. 6 shows a structure of a downlink MIMO in a transmitter.

In order to perform downlink MIMO, a transmitter may include an MIMO encoder 51, a precoder 52, and a subcarrier mapper 53. The MIMO encoder 51 maps L (L≥1) MIMO layers to Mt (Mt≥L) MIMO streams. The Mt MIMO streams become the inputs of the precoder 52. The MIMO layer means an information path that becomes an input of the MIMO encoder 51. The MIMO layer represents one channel coding block. In the case of spatial multiplexing in single user MIMO (SU-MIMO), a rank is defined by the number of streams to be used by a user allocated to a resource unit. In the SU-MIMO, one resource unit is allocated to only one user and only one forward error correction (FEC) block exists as an input of the MIMO encoder 51. In the case of multi-user MIMO (MU-MIMO), a plurality of users may be allocated to one resource unit and a plurality of channel coding blocks may exist as inputs of the MIMO encoder 51. The plurality of channel coding blocks may be generated by performing horizontal encoding or vertical encoding for the plurality of MIMO layers or by performing combination of horizontal encoding and vertical encoding. Using the plurality of MIMO layers may be referred to as multi-layer encoding. The precoder 52 generates a plurality of antenna-specific data symbols in accordance with a selected MIMO mode to map the Mt MIMO streams to the antennas. The subcarrier mapper 53 maps the antenna-specific data symbols to the OFDM symbols.

Through MIMO midamble (hereinafter, referred to as midamble), the channel states of the antennas may be measured. A terminal receives the midamble from the antennas to measure the channel states and a degree of interference from a neighbor cell. A base station receives the channel states measured by the terminal to adaptively schedule resource. In the case of a closed-loop MIMO, the midamble may be used for selecting a precoding matrix indicator (PMI) and for calculating a channel quality indicator (CQI). In the case of an open-loop MIMO, the midamble may be used for calculating the CQI. The midamble may be transmitted from a second downlink subframe of each frame. The midamble may occupy one OFDMA symbol in the second downlink subframe of each frame. When the subframe consists of six OFDMA symbols (type 1 subframe), the subframe may consist of the remaining five OFDMA symbols (type 3 subframe). In addition, when the subframe consists of seven OFDMA symbols (type 2 subframe), the subframe may consist of the remaining six OFDMA symbols (type 1 subframe).

The midamble signals transmitted from the antennas of the base station may be defined by Equation 1.

$$s(t) = \text{Re}\left\{ e^{j2\pi f_c t} \sum_{k=0}^{k=N_{used}-1} b_k \cdot e^{j2\pi\left(k-\frac{N_{used}-1}{2}\right)\Delta f(t-T_g)} \right\} \quad k \neq \frac{N_{used}-1}{2}$$ [Equation 1]

In the Equation 1, k represents a subcarrier index ($0 \leq k \leq N_{used}-1$), $N_{used}$ represents the number of subcarriers used for the midamble, $f_c$ represents the frequencies of the subcarriers, $\Delta f$ represents spacing between the subcarriers, and Tg represents guard time.

$b_k$ is a coefficient for modulating the subcarriers in the OFDMA symbols to which the midamble signals are transmitted and may be defined by Equation 2.

[Equation 2]
$$b_k = \begin{cases} 2.18 \cdot \{1 - 2 \cdot G([k + u + \text{offset}(\mathit{fft})] \mod \mathit{fft})\}, & k \neq \frac{N_{used} - 1}{2}, (k-s)\mod(3 \times N_t) = 3g + \left(\left\lfloor \frac{IDCell}{256} \right\rfloor + \left\lfloor \frac{k-s}{N_1 \times P_{sc}} \right\rfloor\right) \mod 3 \\ 0, & \text{otherwise} \end{cases}$$

In the Equation 2, fft is the magnitude of fast Fourier transform (FFT). u is a shift value and may be defined by u=mod(IDcell,256). IDcell represents a cell ID. g is a transmission antenna index of the base station. Nt is the number of transmission antennas of the base station. s is a parameter that changes in accordance with k. When k≤($N_{used}$−1)/2, s=0. When k>($N_{used}$−1)/2, s=1. G(x) is Golay sequences whose length is 2048, which is defined by Table 2.

Hereinafter, the method for transmitting the midamble signals suggested to support the eight transmission antennas will be described.

The Equations 1 and 2 for supporting the midamble signals for the four transmission antennas may be expanded in order to support the midamble signals for the eight transmission antennas, which will be described.

TABLE 2

| | | | | | | | | | | | |
|---|---|---|---|---|---|---|---|---|---|---|---|
| 0xEDE2 | 0xED1D | 0xEDE2 | 0x12E2 | 0xEDE2 | 0xED1D | 0x121D | 0xED1D | 0xEDE2 | 0xED1D | 0xEDE2 | 0x12E2 |
| 0x121D | 0x12E2 | 0xEDE2 | 0x12E2 | 0xEDE2 | 0xED1D | 0xEDE2 | 0x12E2 | 0xEDE2 | 0xED1D | 0x121D | 0xED1D |
| 0x121D | 0x12E2 | 0x121D | 0xED1D | 0xEDE2 | 0xED1D | 0x121D | 0xED1D | 0xEDE2 | 0xED1D | 0xEDE2 | 0x12E2 |
| 0xEDE2 | 0xED1D | 0x121D | 0xED1D | 0xEDE2 | 0xED1D | 0xEDE2 | 0x12E2 | 0x121D | 0x12E2 | 0xEDE2 | 0x12E2 |
| 0x121D | 0x12E2 | 0x121D | 0xED1D | 0x121D | 0x12E2 | 0xEDE2 | 0x12E2 | 0xEDE2 | 0xED1D | 0xEDE2 | 0x12E2 |
| 0x121D | 0x12E2 | 0xEDE2 | 0x12E2 | 0xEDE2 | 0xED1D | 0xEDE2 | 0x12E2 | 0xEDE2 | 0xED1D | 0x121D | 0xED1D |
| 0xEDE2 | 0xED1D | 0xEDE2 | 0x12E2 | 0x121D | 0x12E2 | 0xEDE2 | 0x12E2 | 0xEDE2 | 0xED1D | 0xEDE2 | 0x12E2 |
| 0xEDE2 | 0xED1D | 0x121D | 0xED1D | 0x121D | 0x12E2 | 0x121D | 0xED1D | 0xEDE2 | 0xED1D | 0x121D | 0xED1D |
| 0x121D | 0x12E2 | 0x121D | 0xED1D | 0x121D | 0x12E2 | 0xEDE2 | 0x12E2 | 0x121D | 0x12E2 | 0x121D | 0xED1D |
| 0xEDE2 | 0xED1D | 0x121D | 0xED1D | 0xEDE2 | 0xED1D | 0xEDE2 | 0x12E2 | 0xEDE2 | 0xED1D | 0x121D | 0xED1D |
| 0x121D | 0x12E2 | 0x121D | 0xED1D | 0xEDE2 | 0xED1D | 0x121D | 0xED1D | | | | |

In the Equation 2, offset(fft) is an offset in accordance with the magnitude of the FFT. Table 3 represents an offset in accordance with the magnitude of the FFT.

TABLE 3

| FFT size | Offset |
|---|---|
| 2048 | 30 |
| 1024 | 60 |
| 512 | 40 |

Figure 7:
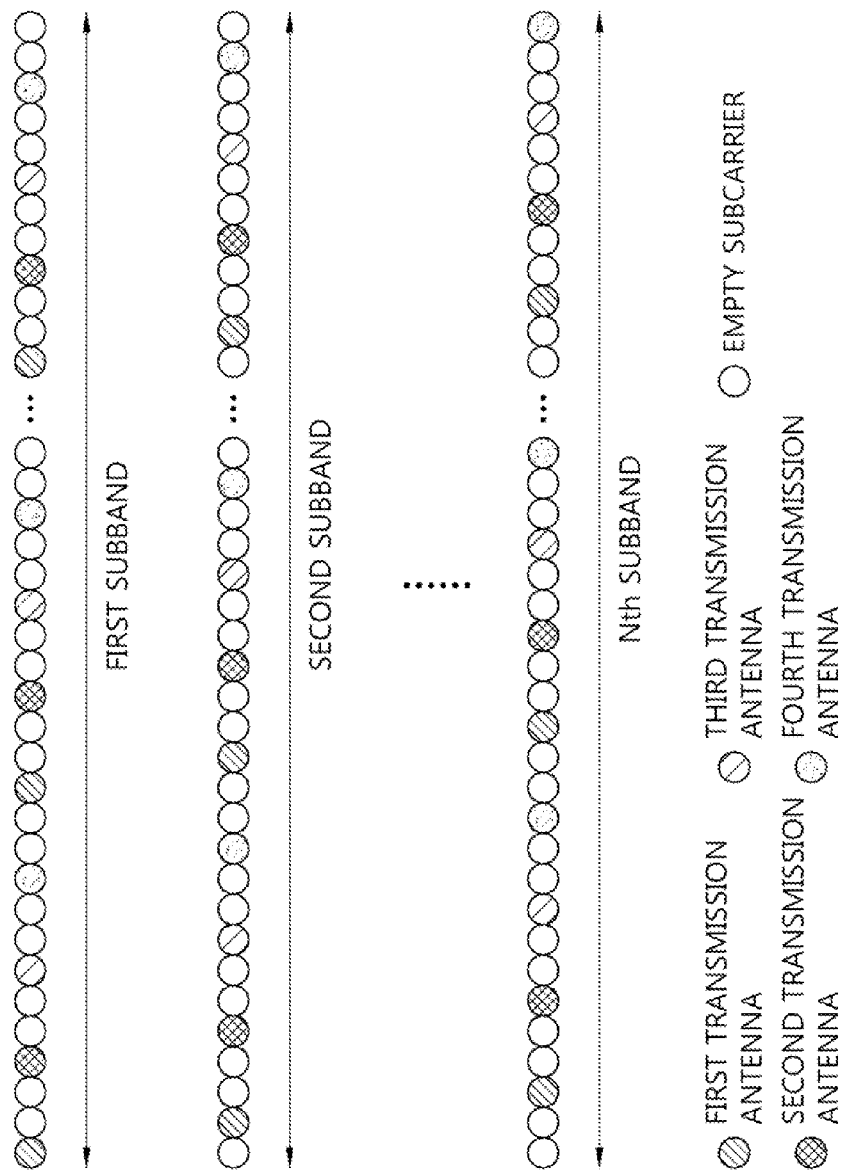
FIG. 7 shows an example of a physical structure of midamble when the number of transmission antennas is four.

FIG. 7 shows an example of a physical structure of midamble when the number of transmission antennas is four.

Referring to FIG. 7, the physical structure of the midamble when IDcell=0 is illustrated. The midamble signals for the transmission antennas are allocated to SBs. In the SBs, the midamble signals are allocated at intervals of three subcarriers. Since the number of transmission antennas is four, the midamble signals for the transmission antennas are allocated at intervals of twelve subcarriers in the SBs. In addition, the midamble signals are shifted between SBs. That is, when the midamble signals are allocated to subcarriers whose indices are 0, 3, 6, 9 . . . in the first SB, the midamble signals are allocated to subcarriers whose indices are 1, 4, 7, 10 . . . in the second SB.

On the other hand, when the midamble signals are generated by the Equations 1 and 2, as illustrated in FIG. 7, the midable signals for the transmission antennas are allocated at intervals of 3* (the number of transmission antennas) subcarriers. Therefore, when the number of transmission antennas is eight, the midamble signals for the transmission antennas are allocated at intervals of 24 subcarriers, which is too large to correctly perform channel estimation. Therefore, a method for transmitting midamble signals for supporting eight transmission antennas based on the Equations 1 and 2 is required.

1) Time division multiplexing (TDM): the midamble signals for the eight transmission antennas are divided into halves to be multiplexed by a TDM method. That is, when midamble signals for certain four antennas and midamble signals for the remaining four antennas may be transmitted in different time regions. For example, midamble signals for antenna indices 0 to 3 are transmitted every even frame and midamble signals for antenna indices 4 to 7 may be transmitted every odd frame. Or, midamble signals for antenna indices 0, 2, 4, and 6 may be transmitted every even frame and midamble signals for antenna indices 1, 3, 5, and 7 may be transmitted every odd frame.

When the midamble signals for the eight transmission antennas are multiplexed by the TDM method, the Equations 1 and 2 may be expressed as illustrated in Equations 3 and 4.

[Equation 3]
$$s(t) = \text{Re}\left\{ e^{j2\pi f_c t} \sum_{k=0}^{k=N_{used}-1} b_k \cdot e^{j2\pi\left(k - \frac{N_{used}-1}{2}\right)\Delta f(t-T_g)} \right\}$$
$$k \neq \frac{N_{used}-1}{2}$$

In the Equation 3, k represents a subcarrier index (0≤k≤$N_{used}$−1), $N_{used}$ represents the number of subcarriers used for the midamble, $f_c$ represents the frequencies of the subcarriers, Δf represents spacing between the subcarriers, and Tg represents guard time.

$b_k$ is a coefficient for modulating the subcarriers in the OFDMA symbols to which the midamble signals are transmitted and may be defined by Equation 4.

[Equation 4]

$$b_k = \begin{cases} 2.18 \cdot \{1 - 2 \cdot G([k + u + \text{offset}(\mathit{fft})] \bmod \mathit{fft})\}, & k \neq \frac{N_{used}-1}{2}, (k-s) \bmod (3 \times N_t) = 3g + \left(\left\lfloor \frac{IDCell}{256} \right\rfloor + \left\lfloor \frac{k-s}{N_1 \times P_{sc}} \right\rfloor\right) \bmod 3 \\ 0, & \text{otherwise} \end{cases}$$

In the Equation 4, G(x) is the Golay sequences whose length is 2048, which is defined by Table 2. fft is the magnitude of FFT. u is a shift value and may be defined by u=mod (IDcell,256). IDcell represents a cell ID. offset(fft) is an offset in accordance with the magnitude of the FFT defined by Table 3. g is a value obtained by performing an operation of mod 4 on the transmission antenna indices of the base station. Nt is the number of transmission antennas of the base station and Nt=4 when the number of transmission antennas is eight. s is a parameter that changes in accordance with k. When k≤(N$_{used}$−1)/2, s=0. When k>(N$_{used}$−1)/2, s=1.

2) Frequency division multiplexing (FDM): the midamble signals for the eight transmission antennas are divided into halves to be multiplexed by an FDM method. That is, the midamble signals for the certain four antennas and the midamble signals for the remaining four antennas may be transmitted in different frequency regions. For example, the midamble signals for the antenna indices 0 to 3 are transmitted in even PRUs of every frame and the midamble signals for the antenna indices 4 to 7 may be transmitted in odd PRUs of every frame. Or, the midamble signals for the antenna indices 0, 2, 4, and 6 may be transmitted in the even PRUs of every frame and the midamble signals for the antenna indices 1, 3, 5, and 7 may be transmitted in the odd PRUs of every frame.

3) TDM+FDM: the midamble signals for the eight transmission antennas are divided into halves to be multiplexed by a method obtained by combining the TDM method and the FDM method. That is, the midamble signals for the certain four antennas and the midamble signals for the remaining four antennas may be transmitted in different time and frequency regions. For example, the midamble signals for the antenna indices 0 to 3 are transmitted in even PRUs of even frames and in odd PRUs of odd frames and the midamble signals for the antenna indices 4 to 7 may be transmitted in odd PRUs of the even frames and in even PRUs of the odd frames. That is, the midamble signals for the transmission antennas are transmitted with the positions of the frequencies mapped every frame alternately changed. Or, the midamble signals for the antenna indices 0, 2, 4, and 6 may be transmitted in the even PRUs of the even frames and in the odd PRUs of the odd frames and the midamble signals for the antenna indices 1, 3, 5, and 7 may be transmitted in the odd PRUs of the even frames and in the even PRUs of the odd frames.

When the midamble signals for the eight transmission antennas are multiplexed by the TDM+FDM method, the Equations 1 and 2 may be expressed as illustrated in Equations 5 and 6.

$$s(t) = \text{Re}\left\{ e^{j2\pi f_c t} \sum_{k=0}^{k=N_{used}-1} b_k \cdot e^{j2\pi \left(k - \frac{N_{used}-1}{2}\right)\Delta f(t-T_g)} \right\} \quad k \neq \frac{N_{used}-1}{2}$$

[Equation 5]

In the Equation 5, k represents a subcarrier index (0≤k≤N$_{used}$−1), N$_{used}$ represents the number of subcarriers used for the midamble, f$_c$ represents the frequencies of the subcarriers, Δf represents spacing between the subcarriers, and Tg represents guard time.

b$_k$ is a coefficient for modulating the subcarriers in the OFDMA symbols to which the midamble signals are transmitted and may be defined by Equation 6.

[Equation 6]

$$b_k = \begin{cases} 2.18 \cdot \{1 - 2 \cdot G([k + u + \text{offset}(\mathit{fft})] \bmod \mathit{fft})\}, & k \neq \frac{N_{used}-1}{2}, (k-s) \bmod (3 \times N_t) = 3g + \left(\left\lfloor \frac{IDCell}{256} \right\rfloor + \left\lfloor \frac{k-s}{N_1 \times P_{sc}} \right\rfloor\right) \bmod 3 \\ 0, & \text{otherwise} \end{cases}$$

In the Equation 6, G(x) is the Golay sequences whose length is 2048, which is defined by Table 2. fft is the magnitude of FFT. u is a shift value and may be defined by u=mod (IDcell,256). IDcell represents a cell ID. offset(fft) is an offset in accordance with the magnitude of the FFT defined by Table 3. g is a value obtained by performing the operation of mod 4 on the transmission antenna indices of the base station. Nt is the number of transmission antennas of the base station and Nt=4 when the number of transmission antennas is eight. s is a parameter that changes in accordance with k. When k≤(N$_{used}$−1)/2, s=0. When k>(N$_{used}$−1)/2, s=1.

At this time, the subcarriers to which the midamble signals are mapped may be limited by Equation 7.

$r \times (N_1 \times P_{sc}) \leq k-s < r \times (N_1 \times P_{sc})+1$, where $0 \leq r \leq N_{used}/(N_1 \times P_{sc})$ [Equation 7]

In the Equation 7, when an antenna index is one of 0 to 3, r may be an even number in an even frame and an odd number in an odd frame. In addition, when the antenna index is one of 4 to 7, r may be an odd number in the even frame and an even number in the odd frame. Frequency regions in which the midamble signals for the transmission antennas are mapped every frame may be limited by the Equation 7.

4) Code division multiplexing (CDM): the midamble signals for the eight transmission antennas are divided into halves to be multiplexed by a CDM method. For example, the midamble signals for the antenna indices 0 to 3 are transmitted every frame based on half of the Golay sequences and the midamble signals for the antenna indices 4 to 7 may be transmitted every frame based on the remaining half of the Golay sequences. The midamble signals for the antenna indices 0, 2, 4, and 6 may be transmitted every frame based on the half of the Golay sequences and the midamble signals for the antenna indices 1, 3, 5, and 7 may be transmitted every frame based on the remaining half of the Golay sequences.

When the midamble signals for the eight transmission antennas are multiplexed by the CDM method, the Equations 1 and 2 may be expressed as illustrated in Equations 8 and 9.

$$s(t) = \text{Re}\left\{ e^{j2\pi f_c t} \sum_{k=0}^{k=N_{used}-1} b_k \cdot e^{j2\pi \left(k - \frac{N_{used}-1}{2}\right) \Delta f(t-T_g)} \right\} \quad \text{[Equation 5]}$$
$$k \neq \frac{N_{used}-1}{2}$$

In the Equation 8, k represents a subcarrier index ($0 \leq k \leq N_{used}-1$), $N_{used}$ represents the number of subcarriers used for the midamble, $f_c$ represents the frequencies of the subcarriers, $\Delta f$ represents spacing between the subcarriers, and Tg represents guard time.

$b_k$ is a coefficient for modulating the subcarriers in the OFDMA symbols to which the midamble signals are transmitted and may be defined by Equation 9.

[Equation 6]

$$b_k = \begin{cases} 2.18 \cdot \{1 - 2 \cdot G([k + u + \text{offset}(\mathit{fft})] \bmod \mathit{fft})\}, & k \neq \frac{N_{used}-1}{2}, (k-s) \bmod(3 \times N_t) = 3g + \left(\left\lfloor \frac{IDCell}{256} \right\rfloor + \left\lfloor \frac{k-s}{N_1 \times P_{sc}} \right\rfloor\right) \bmod 3 \\ 0, & \text{otherwise} \end{cases}$$

In the Equation 9, G(x) is the Golay sequences whose length is 2048, which is defined by Table 2. fft is the magnitude of FFT. u is a shift value and may be defined by u=mod (IDcell,256). IDcell represents a cell ID. offset(fft) is an offset in accordance with the magnitude of the FFT defined by Table 3. g is a value obtained by performing the operation of mod 4 on the transmission antenna indices of the base station. Nt is the number of transmission antennas of the base station and Nt=4 when the number of transmission antennas is eight. s is a parameter that changes in accordance with k. When $k \leq (N_{used}-1)/2$, s=0. When $k > (N_{used}-1)/2$, s=1. When the number of transmission antennas is 2 or 4, F=fft and offset (F)=0. When the number of transmission antennas is eight, F=fft/2. When the antenna index is one of 0 to 3, offset(F)=0. When the antenna index is one of 4 to 7, offset(F)=fft/2.

Figure 8:
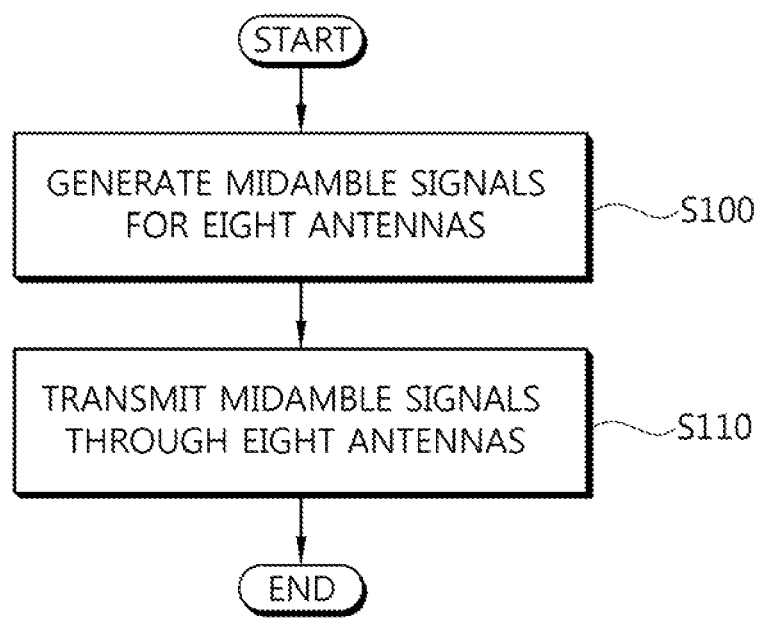
FIG. 8 shows an embodiment of a suggested midamble signal transmitting method.

FIG. 8 shows an embodiment of a suggested midamble signal transmitting method.

In S100, the base station generates the midamble signals for the eight transmission antennas. In S110, the base station transmits the midamble signals to the terminal through the eight transmission antennas. At this time, a first midamble group including the midamble signals for certain four transmission antennas and a second midamble group including the midamble signals for the remaining four transmission antennas among the midamble signals for the eight transmission antennas may be transmitted through different resources and the first midamble group and the second midamble group may be multiplexed by various methods such as the TDM method, the FDM method, the TDM+FDM method, and the CDM method.

Figure 9:
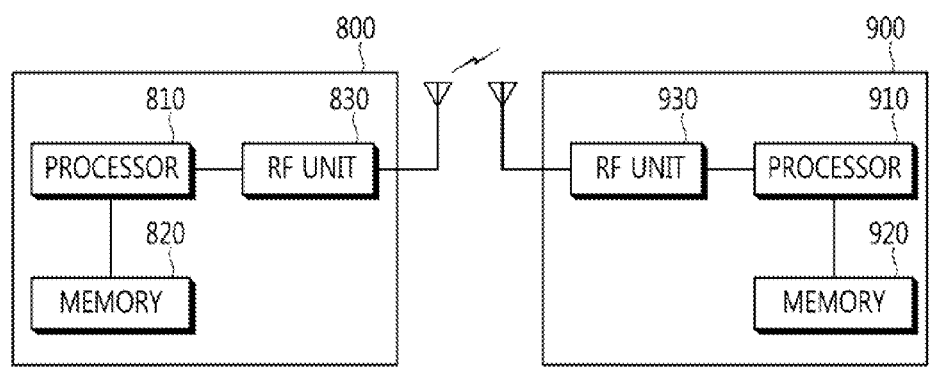
FIG. 9 is a block diagram showing wireless communication system to implement an embodiment of the present invention.

FIG. 9 is a block diagram showing wireless communication system to implement an embodiment of the present invention.

ABS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A terminal 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for transmitting midamble signals in a wireless communication system, the method comprising:

generating midamble signals for eight transmission antennas; and transmitting the midamble signals to a terminal through the eight transmission antennas, wherein a first midamble group including midamble signals for certain four transmission antennas among the midamble signals for the eight transmission antennas and a second midamble group including midamble signals for remaining four transmission antennas among the midamble signals for the eight transmission antennas are transmitted through different resources.

2. The method of claim 1, wherein the first midamble group and the second midamble group are transmitted through different time resources.

3. The method of claim 2, wherein the first midamble group is transmitted in even frames, and wherein the second midamble group is transmitted in odd frames.

4. The method of claim 1, wherein the first midamble group and the second midamble group are transmitted through different time and frequency resources.

5. The method of claim 4, wherein the first midamble group is transmitted in even physical resource units (PRU) of even frames and in odd PRUs of odd frame, and wherein the second midamble group is transmitted in odd PRUs of the even frames and in even PRUs of the odd frames.

6. The method of claim 1, wherein the first midamble group and the second midamble group are transmitted through different sequence resources.

7. The method of claim 6, wherein the first midamble group is transmitted using half of Golay sequences, and wherein the second midamble group is transmitted using remaining half of the Golay sequences.

8. The method of claim 1, wherein the midamble signals are generated by following equation:

$$s(t) = \text{Re}\left\{ e^{j2\pi f_c t} \sum_{k=0}^{k=N_{used}-1} b_k \cdot e^{j2\pi\left(k-\frac{N_{used}-1}{2}\right)\Delta f(t-T_g)} \\ k \neq \frac{N_{used}-1}{2} \right\}$$ [Equation 5]

wherein, k represents a subcarrier index ($0 \leq k \leq N_{used}-1$), $N_{used}$ represents a number of subcarriers used for midamble, $f_c$ represents frequencies of the subcarriers, $\Delta f$ represents spacing between the subcarriers, and $T_g$ represents guard time.

9. A device for transmitting midamble signals in a wireless communication system, the device comprising:

a radio frequency (RF) unit for transmitting or receiving a radio signal; and a processor connected to the RF unit, and configured for:

generating midamble signals for eight transmission antennas; and transmitting the midamble signals to a terminal through the eight transmission antennas, wherein a first midamble group including midamble signals for certain four transmission antennas among the midamble signals for the eight transmission antennas and a second midamble group including midamble signals for remaining four transmission antennas among the midamble signals for the eight transmission antennas are transmitted through different resources.

10. The device of claim 9, wherein the first midamble group and the second midamble group are transmitted through different time resources.

11. The device of claim 10, wherein the first midamble group is transmitted in even frames, and wherein the second midamble group is transmitted in odd frames.

12. The device of claim 9, wherein the first midamble group and the second midamble group are transmitted through different time and frequency resources.

13. The device of claim 12, wherein the first midamble group is transmitted in even physical resource units (PRU) of even frames and in odd PRUs of odd frame, and wherein the second midamble group is transmitted in odd PRUs of the even frames and in even PRUs of the odd frames.

14. The device of claim 9, wherein the first midamble group and the second midamble group are transmitted through different sequence resources.

15. The device of claim 14, wherein the first midamble group is transmitted using half of the Golay sequences, and wherein the second midamble group is transmitted using remaining half of the Golay sequences.

* * * * *